United States Patent
Thompson

(10) Patent No.: US 10,824,765 B2
(45) Date of Patent: Nov. 3, 2020

(54) ELECTRONIC CONTROL UNITS FOR VEHICLES

(71) Applicant: TRW Limited, Solihull (GB)

(72) Inventor: Martin John Thompson, Solihull (GB)

(73) Assignee: TRW Limited, Solihull (GB)

( * ) Notice: Subject to any disclaimer, the term of this patent is extended or adjusted under 35 U.S.C. 154(b) by 199 days.

(21) Appl. No.: 15/745,175

(22) PCT Filed: Jul. 12, 2016

(86) PCT No.: PCT/GB2016/052104
§ 371 (c)(1),
(2) Date: Jan. 16, 2018

(87) PCT Pub. No.: WO2017/009634
PCT Pub. Date: Jan. 19, 2017

(65) Prior Publication Data
US 2019/0012483 A1    Jan. 10, 2019

(30) Foreign Application Priority Data
Jul. 16, 2015 (GB) .................................. 1512462.1

(51) Int. Cl.
*H04L 29/00*    (2006.01)
*G06F 21/72*    (2013.01)
(Continued)

(52) U.S. Cl.
CPC ............ *G06F 21/72* (2013.01); *G06F 9/4401* (2013.01); *G06F 21/575* (2013.01);
(Continued)

(58) Field of Classification Search
CPC .......... G06F 21/72; G06F 21/78; G06F 21/86; G06F 21/575; G06F 9/4401;
(Continued)

(56) References Cited

U.S. PATENT DOCUMENTS 9,792,440 B1\* 10/2017 Wang .................. G06F 21/44
2006/0179302 A1\* 8/2006 Hatakeyama .......... G06F 21/51
713/164

(Continued)

FOREIGN PATENT DOCUMENTS

EP    1679632 A2    7/2006
EP    1990752 A2    11/2008
(Continued)

OTHER PUBLICATIONS

Patents Act 1977: Search Report under Section 17(5), Application No. GB1512462.1, dated Jan. 28, 2016.
(Continued)

*Primary Examiner* — Jeffrey C Pwu
*Assistant Examiner* — Helai Salehi
(74) *Attorney, Agent, or Firm* — MacMillan, Sobanski & Todd, LLC

(57) ABSTRACT

An electronic control unit for a vehicle, the electronic control unit comprising a processor comprising: a processor core; storage, the storage storing data comprising instructions for the processor core; a tamper-resistant hardware security module which is coupled to the storage for reading and writing; and an external interface; the electronic control unit further comprising further storage connected to the processor through the external interface and containing further data; in which the hardware security module is arranged to cause a determination whether the data in the storage has been tampered with and, on a determination that the data has been tampered with, to cause the further data to be loaded into the storage from the further storage over the external interface. Other apparatus and methods for improving the security of electronic control circuits are disclosed.

20 Claims, 5 Drawing Sheets

(51) Int. Cl.
*G06F 21/57* (2013.01)
*G06F 21/78* (2013.01)
*G06F 21/86* (2013.01)
*G06F 9/4401* (2018.01)
*G06F 21/60* (2013.01)

(52) U.S. Cl.
CPC ............ G06F 21/604 (2013.01); G06F 21/78 (2013.01); G06F 21/86 (2013.01); *G06F 2221/034* (2013.01)

(58) Field of Classification Search
CPC .. G06F 21/604; G06F 2221/034; G06F 21/00; G06F 21/10; G06F 21/121; G06F 21/125; G06F 21/128; G11B 20/00086; H04N 21/44236
See application file for complete search history.

(56) References Cited

U.S. PATENT DOCUMENTS

| | | | | |
|---|---|---|---|---|
| 2009/0106563 A1* | 4/2009 | Cherpantier | ............ | G06F 21/86 713/194 |
| 2009/0187700 A1* | 7/2009 | Kern | ................... | G06F 12/0246 711/103 |
| 2009/0222910 A1* | 9/2009 | Le Bihan | ................ | G06F 21/57 726/19 |
| 2010/0070800 A1* | 3/2010 | Hanna | .................... | G06F 21/575 714/6.12 |
| 2013/0124840 A1* | 5/2013 | Diluoffo | ............... | G06F 21/575 713/2 |
| 2014/0143530 A1 | 5/2014 | Martinez | | |
| 2014/0343787 A1 | 11/2014 | Mabuchi | | |

FOREIGN PATENT DOCUMENTS

| | | | | |
|---|---|---|---|---|
| EP | 2164017 A2 * | 3/2010 | ............ | G06F 21/575 |
| EP | 2164017 A2 | 3/2010 | | |

OTHER PUBLICATIONS

Patents Act 1977: Search Report under Section 17(6), Application No. GB1512462.1, dated Jan. 19, 2017.

PCT International Search Report and the Written Opinion, Application No. PCT/GB2016/052104 filed Jul. 12, 2016, dated Nov. 11, 2016.

Peikert, "Cryptographic Error Correction", Thesis, Massachusetts Institute of Technology, 2006, pp. 1-17.

* cited by examiner

ELECTRONIC CONTROL UNITS FOR VEHICLES

CROSS-REFERENCE TO RELATED APPLICATIONS

This application is a national stage of International Application No. PCT/GB2016/052104, filed 12 Jul. 2016, the disclosures of which are incorporated herein by reference in entirety, and which claimed priority to Great Britain Patent Application No. 1512462.1, filed 16 Jul. 2015, the disclosures of which are incorporated herein by reference in entirety.

BACKGROUND OF THE INVENTION

This invention relates to electronic control units for vehicles, and to methods of operation of such electronic control units.

Modern vehicles typically use one or more electronic control units (ECUs) to control functions of the vehicle. In an automobile, this would typically include brake and/or steering actuators, amongst various others. It is desirable, particularly where the ECUs can be connected to external data networks, to ensure that the data executed by the processor of such ECUs is not modified, whether by misfortune or maliciously.

Whereas it has in the past been proposed to determine whether the code in the non-volatile storage of an ECU processor has been tampered with by checking whether it correctly matches a cryptographic signature (using a hardware security module—HSM—which is a tamper-resistant part of the processor and stores keys and algorithms for authentication and encryption/decryption), the response to a determination that it does not has to date generally either been to halt the processor or to continue executing the data in the knowledge that it is potentially compromised. Neither of these options is entirely palatable in a vehicle which needs functioning ECUs to operate safely, even in a "limp-home" mode. Another option which has been presented in the past is to limit access to encryption keys if the software is found to be compromised. Although this protects the system against rogue software sending messages that appear trustworthy, it does not protect the local functions, which may have safety implications, from the operation of the rogue software.

The HSM is typically the only trusted part of the system, and can be used as the basis for a secure boot of a system, by authenticating the lowest-level bootloader and then allowing boot to proceed from there (for example, see the Bachelor's thesis "*Secure Boot of an Embedded Multicore Processor System*" by Benjamin Nagel of Ruhr Universität Bochum). It is not possible for the application software running on the processor of an ECU to securely interrogate the HSM and then operate on the result of this interrogation as the application software may already be suspect (so may have been programmed to just ignore the "fail" result from the HSM).

The intent of the security is to prevent harm. This harm could be (for example) physical, financial, privacy intrusion or reputational.

One key harm which must be considered when thinking about the potential reaction to a security breach is a "denial of service"; here, a car could be rendered undriveable by an external agent, which will indirectly result in harm, whether physical, if the vehicle is located somewhere hazardous that the driver must get away from quickly, or reputational, on the part of the vehicle manufacturer who will suffer harm from the reports of the vehicle not starting.

Harm can also come from peripherals (which are how the processing units understands and influences the outside world). For example, the application software will request pulses of certain timings to provide a torque demand in a steering system, or messages to be sent from a driver assist system (DAS) sensor, or information to be shared with an internet service. Any of these, if incorrect (either through error or through the activity of an malicious actor), would be a problem.

It is vital (for some ECUs) that the function of the ECU remain intact, even in the face of software which has been tampered with. It may be that a limp-home or reduced-functionality is acceptable.

Example limp-home functionality:
DAS systems (e.g. radar) could just not operate, although as vehicles move to increased autonomy, this will not be acceptable.
Braking ECUs could (e.g.) fall back to only providing no active functions such as slip-control. However, the braking ECU may be responsible for providing vehicle-speed messages to the rest of the vehicle (e.g. the dashboard) and so the interface from the sensors to the communications must remain intact and untampered.
Engine and Steering ECUs both require the peripherals to do very precisely-controlled dynamic activities, even in a limp-home mode, so merely blocking access to peripherals is not possible.

BRIEF SUMMARY OF THE INVENTION

According to a first aspect of the invention, we provide an electronic control unit for a vehicle, the electronic control unit comprising a processor comprising:
a processor core;
storage, the storage storing data comprising instructions for the processor core;
a tamper-resistant hardware security module which is coupled to the storage for reading and writing; and
an external interface;
the electronic control unit further comprising further storage connected to the processor through the external interface and containing further data;
in which the hardware security module is arranged to cause a determination as to whether the data in the storage has been tampered with and, on a determination that the data has been tampered with, to cause the further data to be loaded into the storage from the further storage over the external interface.

As such, should it be determined that the data in storage has been tampered with, the electronic control unit (ECU) can make use of the hardware security module to cause new data to be loaded into the storage. Typically, it will be less likely that the further data has been tampered with.

Typically, the hardware security module will also be arranged to cause a determination whether the further data has been tampered with after it has been written to the storage. If there is a determination that the further data has been tampered with, the hardware security module may cause supplemental data to be loaded from the further storage into the storage for execution by the processor core, and may also cause a determination whether the supplemental data has been tampered with. Alternatively or additionally, if there is a determination that the further data or the supplemental data has been tampered with, the hardware security module may be arranged so as to halt the processor and/or the processor core.

The electronic control unit may be arranged so that the determination of whether the data (or the further or supplemental data) has been tampered with comprises checking whether the data (or the further or supplemental data) has a signature that can be verified using a key held (typically securely) in the hardware security module. Thus, the data will only be allowed to be executed if the signature (typically cryptographic) is correctly verified.

In normal use, the storage may contain data representing a first application for execution by the processor. The further data may represent a replacement application for execution by the processor, which may have reduced functionality—a "limp home" functionality—compared with the first application. Alternatively, it could be a complete unmodified copy of the first application.

Typically, the further storage will be external to the processor. The processor may be a single integrated circuit, with the further storage being on a different integrated circuit. This allows the amount of storage on the processor to be reduced, but still allowing the benefits of the further data to be maintained.

The storage and the further storage may both be non-volatile storage, which is arranged to retain data stored therewithin when electrical power is removed from the electronic control unit.

Each determination caused by the hardware security module may be carried out by the hardware security module, the processor core or both. In one embodiment, each determination caused by the HSM will be carried out by the HSM as it is the only trusted part of the system. In some systems, the HSM controls the whole boot process and the application processor is blocked from performing any tasks at all until the HSM has validated the code that the processor will be running.

In another embodiment, only a small so-called 'boot-loader' will be checked by the HSM, and the application processor will then execute that code. Within this code (which is now trusted) will reside the functions which check the remainder of the code (which will typically form the application of the system). The functions which check the remainder of the code will utilise the functions of the HSM to provide determinations of whether the application code (and any associated data) has been tampered with.

According to a second aspect of the invention, there is provided a method of operating an electronic control unit of a vehicle, the electronic control unit comprising a processor comprising:
  a processor core;
  storage, the storage storing data comprising instructions for the processor core;
  a tamper-resistant hardware security module which is coupled to the storage for reading and writing; and
  an external interface
the electronic control unit further comprising further storage connected to the processor through the external interface and containing further data;
the method comprising determining whether the data in the storage has been tampered with and, on a determination that the data has been tampered with, the further data to be loaded into the storage from the further storage over the external interface.

As such, should it be determined that the data in storage has been tampered with, the method can make use of the hardware security module can cause new data to be loaded into the storage. Typically, it will be less likely that the further data has been tampered with.

Typically, the method will also comprise determining whether the further data has been tampered with after it has been written to the storage. If there is a determination that the further data has been tampered with, supplemental data may be loaded from the further storage into the storage for execution by the processor core, and a determination made whether the supplemental data has been tampered with. Alternatively or additionally, if there is a determination that the further data or the supplemental data has been tampered with, the method may comprise halting the processor and/or the processor core.

The determination of whether the data (or the further or supplemental data) has been tampered with may comprise checking whether the data (or the further or supplemental data) has a signature that can be verified using a key held (typically securely) in the hardware security module. Thus, the data will only be allowed to be executed if the signature (typically cryptographic) is correctly verified.

Typically, the further storage will be external to the processor. The processor may be a single integrated circuit, with the further storage being on a different integrated circuit. This allows the amount of storage on the processor to be reduced, but still allowing the benefits of the further data to be maintained.

Each determination may be carried out by the hardware security module, the processor core or both.

In normal use, the storage may contain data representing a first application for execution by the processor. The further data may represent a replacement application for execution by the processor, which may have reduced functionality—a "limp home" functionality—compared with the first application.

The storage and the further storage may both be non-volatile storage, which is arranged to retain data stored therewithin when electrical power is removed from the electronic control unit.

According to a third aspect of the invention, there is provided an electronic control unit for a vehicle, the electronic control unit comprising a processor comprising:
  a processor core;
  first storage, the storage storing data comprising instructions for the processor core; and
  a tamper-resistant hardware security module which is coupled to the first storage for reading;
  in which the first storage stores an encrypted boot loader, the hardware security module being arranged on booting of the electronic control unit to read the encrypted boot loader from the first storage and to decrypt it within the hardware security module to form an decrypted boot loader, the processor core being arranged so as to read and run the decrypted boot loader on booting of the electronic control unit.

Thus, the hardware security module (HSM) can decrypt an encrypted bootloader, which is likely to be harder to compromise than an unencrypted one.

The hardware security module may be arranged to cause a determination whether the decrypted boot loader has been tampered with. It may also be arranged so that, should there be a determination that the decrypted boot loader has been tampered with, to prevent the processor core from running the decrypted boot loader. As such, this is a further step to ensure the integrity of the boot loader.

The electronic control unit may comprise second storage, and the hardware security module may be arranged so as to write the decrypted boot loader to the second storage and the processor core may be arranged to read the decrypted boot loader from the second storage. Alternatively, the hardware security module can transmit the decrypted boot loader to the processor core for the processor core to execute.

The first storage may only be readable and/or writable by the processor core through the hardware security module. In such a case, third storage can be provided in the processor, which can be read by the processor core without the intervention of the processor core.

In an alternative, the processor core is arranged to read data from the first storage both through the hardware security module (typically where decryption is required) and without the intervention of the hardware security module. Thus, both secured and unsecured data can be stored in the storage.

The first storage may be a non-volatile storage, which is arranged to retain data stored therewithin when electrical power is removed from the processor. The second storage will typically be a volatile storage of the processor, which is liable to lose data stored therewithin on removal of electrical power from the processor.

According to a fourth aspect of the invention, there is provided a method of controlling an electronic control unit of a vehicle, the electronic control unit comprising a processor comprising:
 a processor core;
 first storage, the storage storing data comprising instructions for the processor core; and
 a tamper-resistant hardware security module which is coupled to the first storage for reading;
 in which the first storage stores an encrypted boot loader,
 the method comprising, on booting of the electronic control unit, the hardware security module reading the encrypted boot loader from the first storage and to decrypting it within the hardware security module to form an decrypted boot loader, the processor core reading and running the decrypted boot loader.

Thus, the hardware security module (HSM) can decrypt an encrypted bootloader, which is likely to be harder to compromise than an unencrypted one.

The method may comprise determining whether the decrypted boot loader has been tampered with. The method may also comprise, on a determination that the decrypted boot loader has been tampered with, preventing the processor core from running the decrypted boot loader. As such, this is a further step to ensure the integrity of the boot loader.

The electronic control unit may comprise second storage, and the method may comprise writing the decrypted boot loader to the second storage and the processor core reading the decrypted boot loader from the second storage. Alternatively, the method may comprise the hardware security module transmitting the decrypted boot loader to the processor core and the processor executing the decrypted boot loader.

The method may comprise reading from and/or writing to the first storage by the processor core only through the hardware security module. In such a case, third storage can be provided in the processor, which can be read by the processor core without the intervention of the processor core.

In an alternative, the method comprises the processor core reading data from the first storage both through the hardware security module (typically where decryption is required) and without the intervention of the hardware security module. Thus, both secured and unsecured data can be stored in the storage.

The first storage may be a non-volatile storage, which is arranged to retain data stored therewithin when electrical power is removed from the processor. The second storage will typically be a volatile storage of the processor, which is liable to lose data stored therewithin on removal of electrical power from the processor.

According to a fifth aspect of the invention, we provide an electronic control unit for a vehicle, the electronic control unit comprising a processor comprising:
 a processor core;
 storage, the storage storing data comprising instructions for the processor core; and
 a tamper-resistant hardware security module which is coupled to the storage for reading and writing;
 in which the hardware security module is arranged to perform cryptographic error correction on the data as it is read from the storage to be passed to the processor core for execution.

Thus, errors, at least of up to a certain size, be they accidental or malicious, can be corrected in the code before it is executed.

Typically, the electronic control unit will be provided with key storage, which stores at least one first cryptographic key. The data may be split up into at least one block, each block being signed with a second cryptographic key corresponding to the first cryptographic key such that the cryptographic error correction relies on the second cryptographic key in performing the cryptographic error correct to indicate whether each block of data was signed with a corresponding first cryptographic key and whether the block of data has been altered since signature, and if so to correct any alterations in the data.

The corresponding first and second cryptographic keys may be identical; however, in a preferred embodiment they are corresponding public and private keys, with the first cryptographic key being the public key and the second cryptographic key being the private key. As such, the electronic control unit may not store each second cryptographic key.

The processor core may be provided with a cache for the data which is arranged to read the data in cachelines; each block may represent one cacheline of data after cryptographic error correction.

Typically, the electronic control unit will be arranged so that it is not possible for the processor core to read the data except through the hardware security module. This ensures that all of the data is checked for errors before it is executed.

According to a sixth aspect of the invention, there is provided a method of operating an electronic control unit of a vehicle, the electronic control unit comprising a processor comprising:
 a processor core;
 storage, the storage storing data comprising instructions for the processor core; and
 a tamper-resistant hardware security module which is coupled to the storage for reading and writing;
 the method comprising carrying out, typically using the hardware security module, cryptographic error correction on the data as it is read from the storage to be passed to the processor core for execution.

Thus, errors, at least of up to a certain size, be they accidental or malicious, can be corrected in the code before it is executed.

Typically, the method will comprise storing, in the electronic control unit, at least one first cryptographic key. The data may be split up into at least one block, each block being signed with a second cryptographic key corresponding to the first cryptographic key such that the cryptographic error correction relies on the second cryptographic key in performing the cryptographic error correct to indicate whether each block of data was signed with a corresponding first cryptographic key and whether the block of data has been altered since signature, and if so to correct any alterations in the data.

The corresponding first and second cryptographic keys may be identical; however, in a preferred embodiment they are corresponding public and private keys, with the first cryptographic key being the public key and the second cryptographic key being the private key. As such, the electronic control unit may not store each second cryptographic key.

Where the processor core has a cache for the data, the method may comprise reading the data in cachelines; each block may represent one cacheline of data after cryptographic error correction.

Typically, the method will include not loading the data into the processor core except through the hardware security module. This ensures that all of the data is checked for errors before it is executed.

According to a seventh aspect of the invention, there is provided a vehicle comprising the electronic control unit of any of the first, third or fifth aspects of the invention.

Typically, the vehicle may be provided with at least one actuator controlled by the electronic control unit. The actuators may be selected from the group comprising brake actuators, steering actuators and actuators to control the performance of an internal combustion engine of the vehicle.

Furthermore, the vehicle may be provided with at least one sensor coupled to the electronic control unit so as to provide the electronic control unit with data. The sensors may be selected from the group comprising speed sensors, position sensors, and sensors arranged to sense the position of other objects (such as radar, sonar or lidar sensors).

The vehicle may comprise a vehicle bus (such as a CAN bus) to which the electronic control unit is attached. Typically, the vehicle would also comprise peripherals connected to the vehicle bus. At least one of the peripherals may be provided with a port to allow access to data external to the vehicle; the port may be a network interface, typically a radio network interface, which allows connection to an external network, such as the Internet. The electronic control unit may be arranged to allow data received at the network port to be written to the storage.

The vehicle may be a road vehicle, such as an automobile, or a track vehicle, such as a train. Alternatively, it may be an aeroplane.

Other advantages of this invention will become apparent to those skilled in the art from the following detailed description of the preferred embodiments, when read in light of the accompanying drawings.

DETAILED DESCRIPTION OF THE INVENTION

Figure 1:
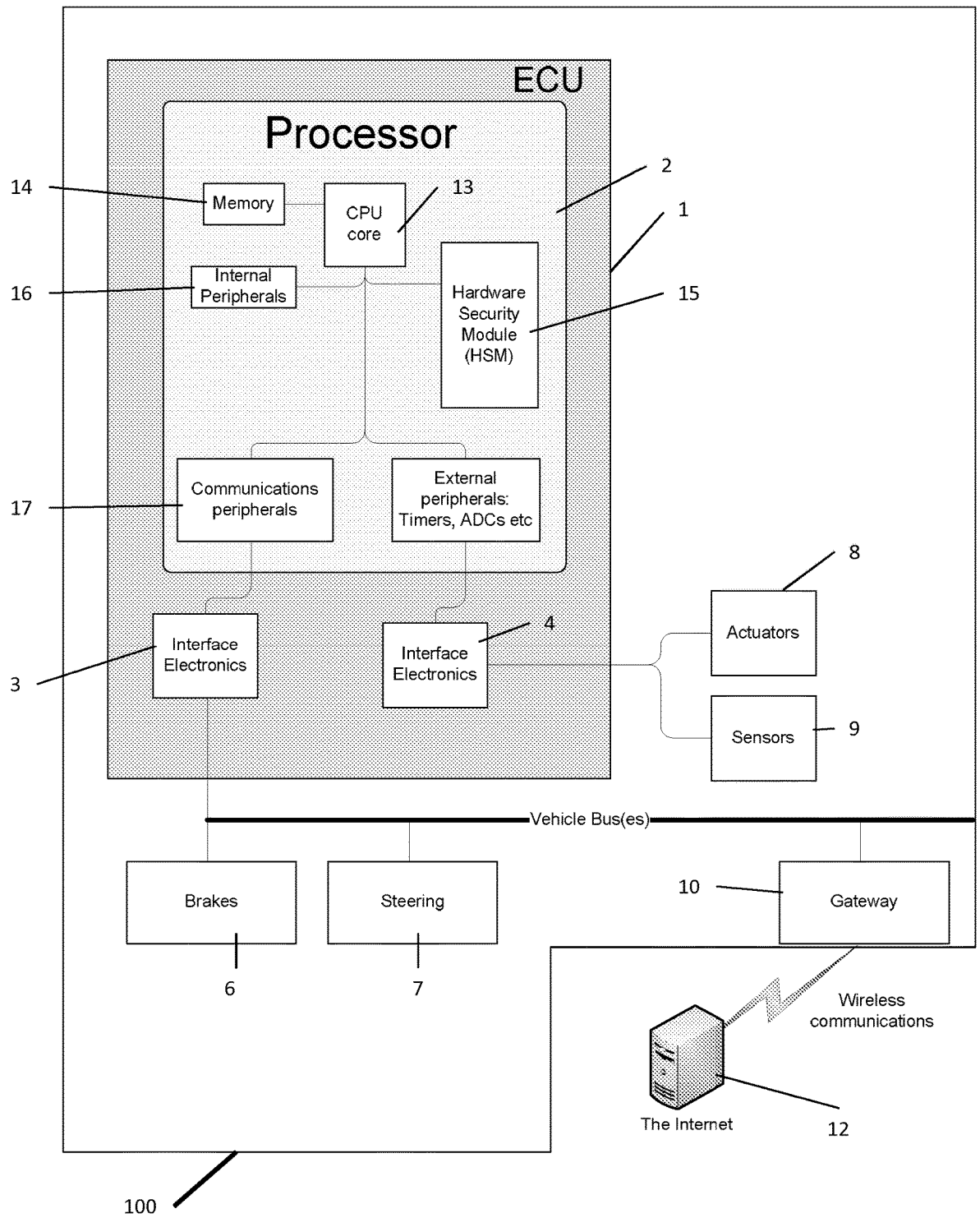
FIG. 1 shows an exemplary electronic control unit as may be used in the various embodiments of the invention.

An electronic control unit (ECU) 1 is shown within a vehicle 100 in FIG. 1 of the accompanying drawings, which can be used in the various embodiments of the invention. The vehicle in this case is an automobile. The electronic control unit 1 comprises a processor 2, which is a single integrated circuit, connected to external interfaces 3, 4 within the ECU 1. External interface 3 connects the ECU 1 to a CAN bus 5, to which other units (such as Brake ECU 6, Steering ECU 7, and a Gateway 10 are connected). External interface 4 connects the ECU 1 to actuators 8 (e.g. brake or steering actuators) and sensors 9 (e.g. speed or position sensors) of the vehicle 100.

The gateway 10 (which may be part of a radio of the vehicle) has a wireless network interface 11, which allows communication with an external network 12, in this case the Internet. As such, this allows data received over the network 12 to be passed through the CAN bus 5 to the ECU 1, which represents a potential security risk should malicious code be stored and executed on the processor 1. Typically, the gateway will be arranged to mitigate against many common security risks, but there always remains the possibility of a breach through the gateway.

The processor 2 itself comprises, as discussed above, a single integrated circuit, which has several features. It has a processor core 13 which carries out most of the processing functions of the ECU 1. It has memory 14, in which data and program instructions are held. There are various internal peripherals 16, such as watchdog timers, signal processing accelerators, direct-memory-access (DMA) controllers. There are communications peripherals which communicate with the external interface 3. There are also a set of peripherals, such as analogue to digital converters (ADCs), timers and so on which communicate with the external interface 4.

The processor also has a hardware security module (HSM) 15, which is tamper resistant; whilst tamper resistance HSMs are well known in the art, and the skilled man would have little trouble implementing such an HSM (see, for example, the techniques described in chapter 16 of the book "Security Engineering" (second edition), by Ross Anderson, ISBN 978-0470068526), in an example, the HSM can be made tamper resistant by including it on the same area of silicon integrated circuit as the processor core. Metal layers can be added in the integrated circuit to detect probing attempts, and voltage sensors to detect voltage glitches which can cause malicious intention malfunctions. This carries out various functions as described below with respect to the various embodiments.

Figure 2:
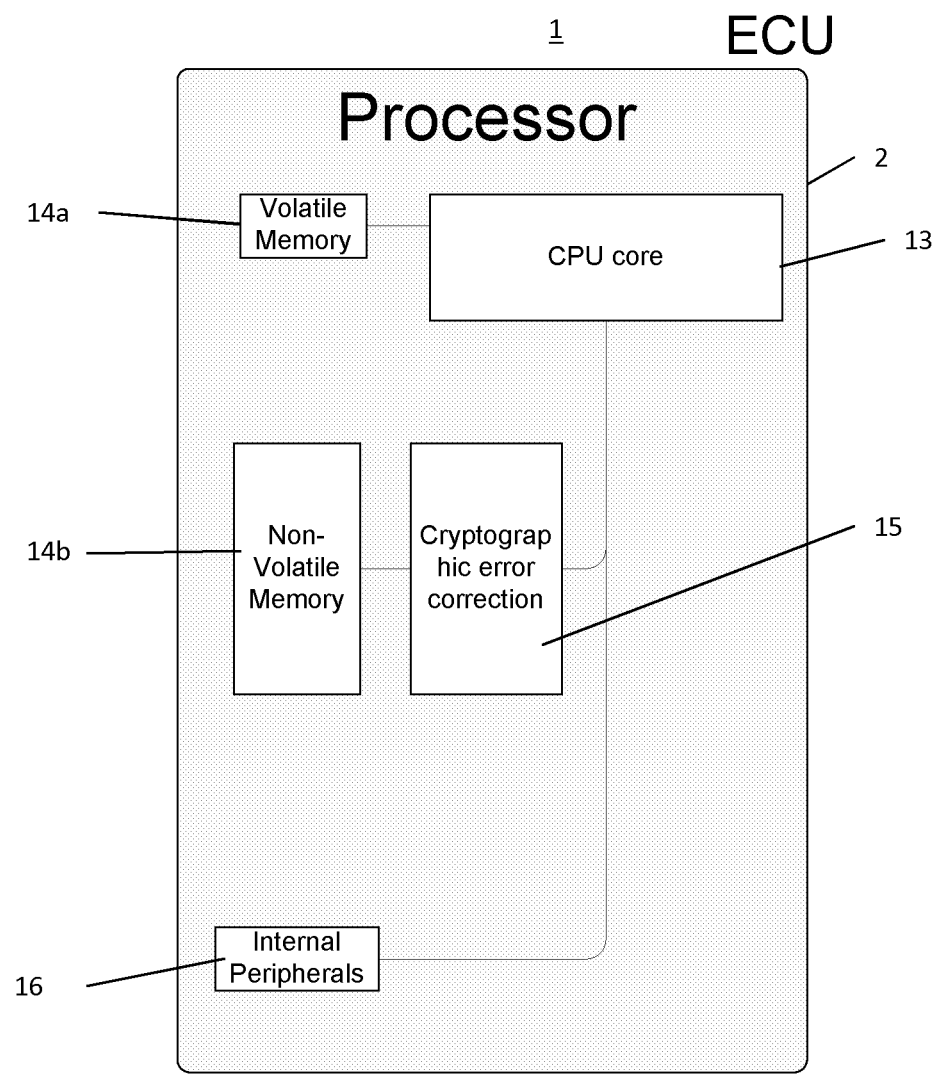
FIG. 2 shows the electronic control unit of FIG. 1, used in accordance with a first embodiment of the invention.

In a first embodiment of the invention, shown in FIG. 2 of the accompanying drawings, the memory 14 of the processor 2 is provided as volatile memory 14a (that is liable to lose its contents when power is lost) and non-volatile memory 14b (which is not liable to lose its contents when power is lost). In this embodiment, the HSM 15 mediates between the processor core 13 and the non-volatile memory 14b, such that all reading of the non-volatile memory 14b passes through the HSM 15.

As such, the HSM carries out cryptographic error correction on all data read from the non-volatile member 14b for execution by the processor core 13. Cryptographic error correction is a technique that makes use of cryptographic keys to correct errors in data, as is described in the Doctor of Philosophy (PhD) thesis of Christopher Jason Peikert of the Massachusetts Institute of Technology, entitled "Cryptographic Error Correction".

In the present case, each cacheline of data stored in the non-volatile memory 14b which is to be read from the non-volatile memory 14b has been previously signed with a (typically private) key, which is not stored in the ECU 1. When that data is read from the non-volatile member 14b, the HSM 15 uses a corresponding (typically public) key stored in the HSM 15 to check the integrity of that data. If errors are found then, up to a certain size of error, those errors can be corrected. Thus, small changes in the data—which are often all malicious actors need to make in order to cause some harm—can be corrected.

Typically, the key(s) stored in the HSM would be stored within the HSM securely at production, and it would only be possible to update the key(s) stored in the HSM through some secure protocol.

Figure 3:
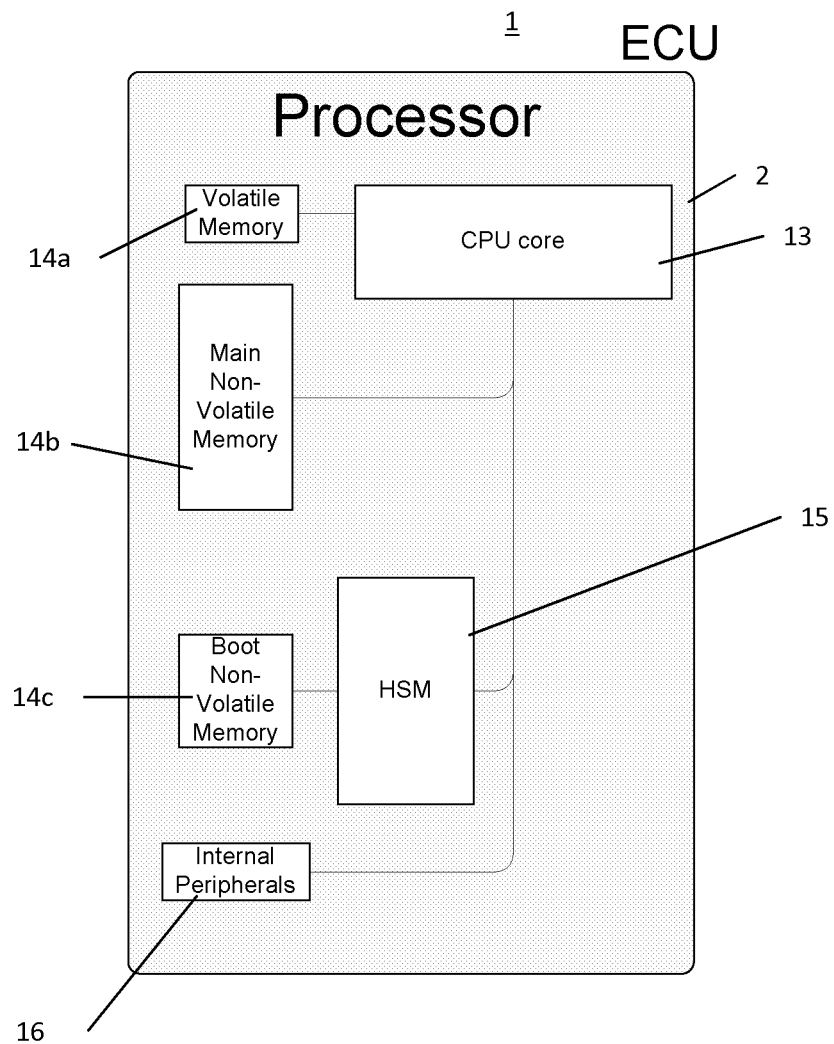
FIG. 3 shows the electronic control unit of FIG. 1, used in accordance with a second embodiment of the invention.
Figure 4:
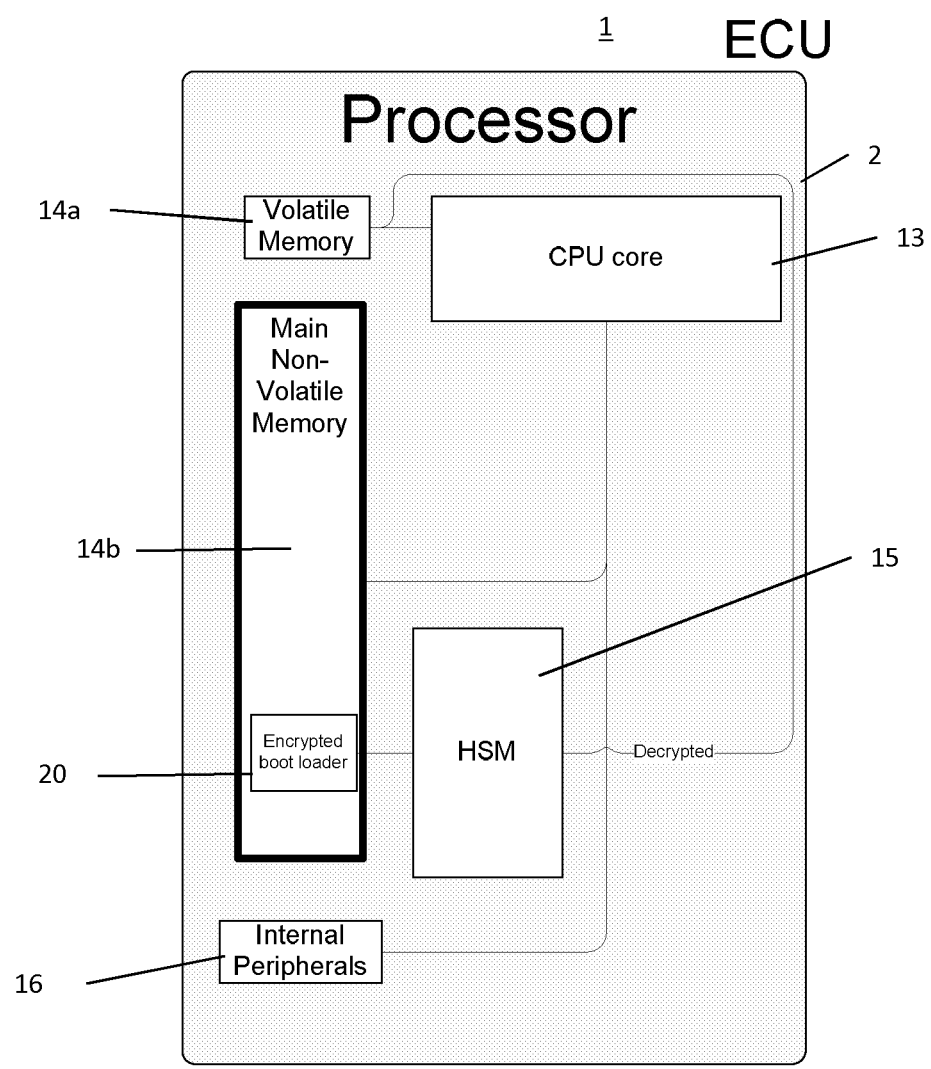
FIG. 4 shows the electronic control unit of FIG. 1, used in accordance with a third embodiment of the invention.

In a second embodiment, shown in FIG. 3 of the accompanying drawings, the memory 14 of the ECU 1 is provided as volatile memory 14a, main non-volatile memory 14b and boot non-volatile member 14c. The HSM 15 mediates all reads from the boot non-volatile memory 14c. The boot non-volatile memory 14c holds a bootloader for the ECU 1; that is, the first code that is executed by the processor core 13 on booting of the ECU 1. The bootloader is encrypted using a key, which is stored in the HSM 15.

In order to boot, the HSM 15 decrypts the bootloader using the key stored in the HSM 15 (although a public/private key pair could be used instead). The HSM transmits the decrypted bootloader to the processor core 13 for the processor core to execute. The HSM can also check that the bootloader has been correctly decrypted and that the decrypted bootloader matches its cryptographic signature using the same key that the HSM holds. The HSM 15 will only allow the processor core 13 to execute the decrypted boot loader if the decrypted bootloader is successfully authenticated in this manner.

It is to be noted that all reading from the boot non-volatile memory 14c is through the HSM. It is possible that writing to the boot non-volatile memory 14c can similarly restricted, or even prevented after production, such as by blowing a fuse on write lines into the boot non-volatile memory.

The third embodiment of the invention is similar to the second embodiment, apart from the encrypted boot loader 20 is held within the main non-volatile memory 14b and there is no boot non-volatile member 14c. The processor core can read the non-volatile member 14b directly or through the HSM 15. It uses the HSM 15 to decrypt the encrypted boot loader 20 as discussed above; this can be written into volatile member 14a for the processor core 13 to execute. Otherwise, this embodiment functions as in the second embodiment.

Figure 5:
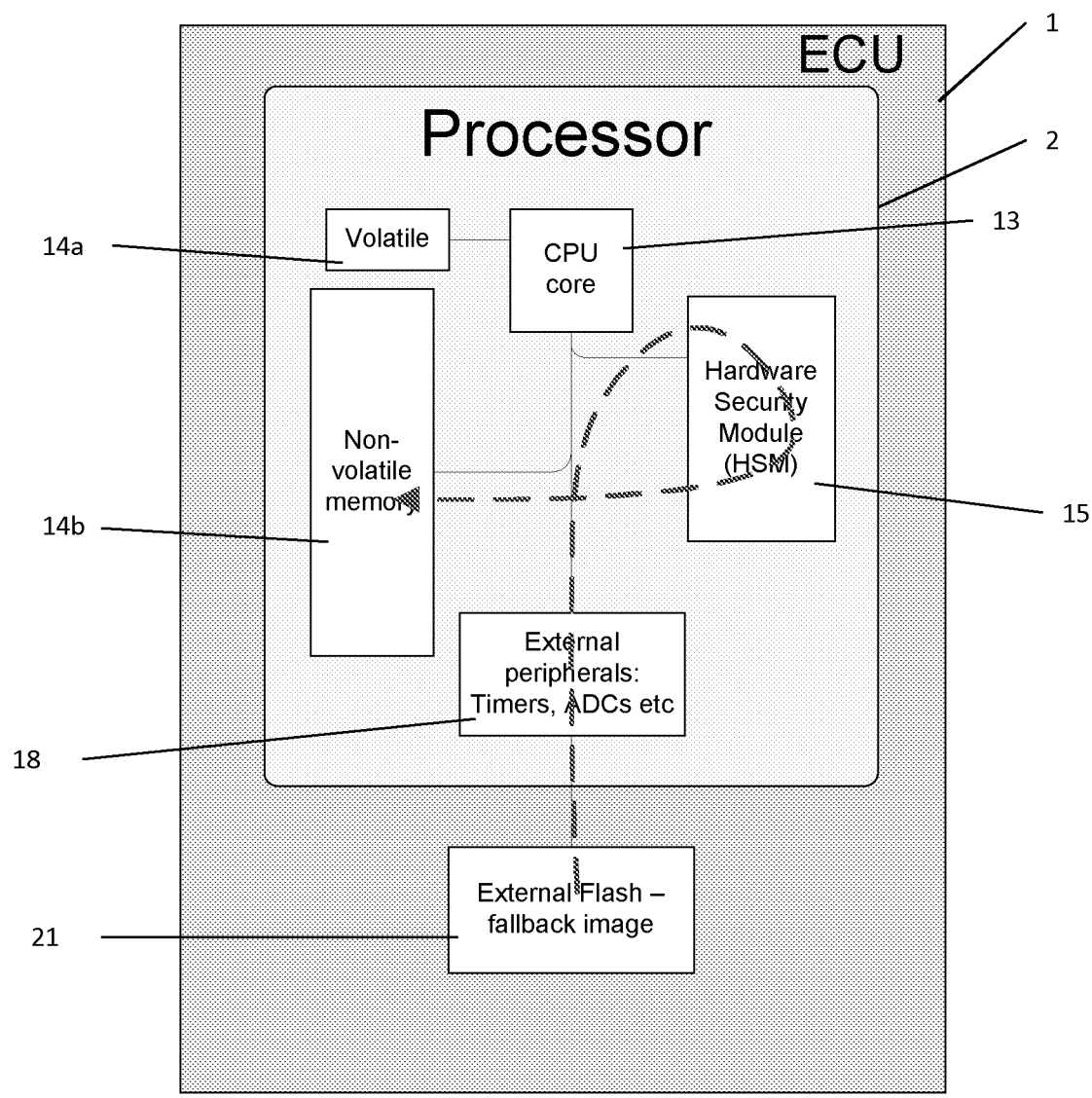
FIG. 5 shows the electronic control unit of FIG. 1, used in accordance with a fourth embodiment of the invention.

In the fourth embodiment of the invention, shown in FIG. 5 of the accompanying drawings, the processor core 13 can directly read and write from the non-volatile memory 14b. However, the HSM 15 regularly checks the contents of the non-volatile memory 14b. Typically, it will do this whenever otherwise idle.

Each block of data in the non-volatile memory 14b will have been signed using a (typically private) key not stored in the ECU 1. On each check, the HSM 15 checks that the signature of each block verifies the contents of each block, using a key (typically public) that is stored in the HSM 15.

If it is determined that the data in the non-volatile memory 14b does not match its signature, the HSM 15 will read a fallback image from external memory 21. The external memory is still contained in the ECU 1, but is on a different integrated circuit to the processor 2. This fallback image is written to the non-volatile member 14b. The fallback image will also be signed, and the HSM 15 will use its key to verify that the contents of the fallback image have not been tampered with. Only then will the HSM 15 allow the processor core 13 to execute the fallback image.

Typically, the fallback image will contain a more limited application for the ECU 1 than the data otherwise stored in the non-volatile memory 14b. For example, in a steering system it may only provide power assistance to the driver and not allow autonomous driving functions. In a braking system it may only provide core braking activities and not more advanced functions such as stability control or autonomy. Given that the fallback image is both encrypted and signed, it will be difficult for a third party to maliciously change the software run by the ECU 1, as any changes will lead to a trusted code being executed.

If the HSM 15 determines that the contents of the fallback image are not verified by its signature, the HSM will not allow the processor core 13 to execute it, and instead may load a further fallback image from the external storage 21, or simply halt the processor core 13.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An electronic control unit for a vehicle, the electronic control unit comprising a processor comprising:
  a processor core;
  storage, the storage storing data comprising instructions for the processor core;
  a tamper-resistant hardware security module which is coupled to the storage for reading and writing; and
  an external interface;
the electronic control unit further comprising further storage connected to the processor through the external interface and containing further data;
in which the hardware security module is arranged to cause a determination whether the data in the storage has been tampered with and, on a determination that the data has been tampered with, to cause the further data to be loaded into the storage from the further storage over the external interface; and
wherein the processor is comprised of a first integrated circuit, and wherein the further storage is comprised of a second integrated circuit separate from the first integrated circuit; and
wherein determination of whether the data has been tampered with comprises checking whether the data has a signature that can be verified using a key held in the hardware security module.

2. The electronic control unit of claim 1, in which the hardware security module is arranged to cause a determination whether the further data has been tampered with after the further data has been written to the storage.

3. The electronic control unit of claim 1, in which the further storage is external to the processor.

4. The electronic control unit of claim 1, arranged such that each determination is carried out by the hardware security module, the processor core or both.

5. The electronic control unit of claim 1, in which in normal use, the storage contains data representing a first application for execution by the processor and the further data represents a replacement application for execution by the processor, which has reduced functionality compared with the first application.

6. The electronic control unit of claim 2, in which if there is a determination that the further data has been tampered with, the hardware security module causes supplemental data to be loaded from the further storage into the storage for execution by the processor core.

7. The electronic control unit of claim 2, in which, if there is a determination that the further data has been tampered with, the hardware security module is arranged so as to halt the processor and/or the processor core.

8. A method of operating an electronic control unit of a vehicle, the electronic control unit comprising a processor comprising:
   a processor core;
   storage, the storage storing data comprising instructions for the processor core;
   a tamper-resistant hardware security module which is coupled to the storage for reading and writing; and
   an external interface;
the electronic control unit further comprising further storage connected to the processor through the external interface and containing further data;
the method comprising determining whether the data in the storage has been tampered with and, on a determination that the data has been tampered with, the further data being loaded into the storage from the further storage over the external interface; and
wherein the processor is comprised of a first integrated circuit, and wherein the further storage is comprised of a second integrated circuit separate from the first integrated circuit; and
wherein the determination of whether the data has been tampered with comprises checking whether the data has a signature that can be verified using a key held in the hardware security module.

9. The method of claim 8 comprising determining whether the further data has been tampered with after the further data has been written to the storage.

10. The method of claim 8, in which each determination is carried out by the hardware security module, the processor core or both.

11. The method of claim 8, in which in normal use, the storage contains data representing a first application for execution by the processor and the further data represents a replacement application for execution by the processor, which has reduced functionality compared with the first application.

12. The method of claim 9, in which if there is a determination that the further data has been tampered with, supplemental data is loaded from the further storage into the storage for execution by the processor core.

13. The method of claim 9, in which if there is a determination that the further data or the supplemental data has been tampered with, the method comprises halting the processor and/or the processor core.

14. An electronic control unit for a vehicle, the electronic control unit comprising a processor comprising:
   a processor core;
   storage, the storage storing data comprising instructions for the processor core, wherein the storage comprises key storage which stores at least one first cryptographic key; and
   a tamper-resistant hardware security module which is coupled to the storage for reading and writing;
in which the hardware security module is arranged to perform cryptographic error correction on the data as it is read from the storage to be passed to the processor core for execution;
wherein the data is split up into at least one block, each block being signed with a second cryptographic key corresponding to the first cryptographic key such that the cryptographic error correction relies on the first cryptographic key in performing the cryptographic error correction to indicate whether each block of data was signed with a corresponding second cryptographic key and whether the block of data has been altered since signature, and if so to correct any alterations in the data.

15. The electronic control unit of claim 14, in which the processor core is provided with a cache for the data which is arranged to read the data in cachelines; each block representing one cacheline of data after cryptographic error correction.

16. The electronic control unit of claim 14, arranged so that it is not possible for the processor core to read the data except through the hardware security module.

17. The electronic control unit of claim 14 wherein the processor is comprised of a single integrated circuit.

18. A method of operating an electronic control unit of a vehicle, the electronic control unit comprising a processor comprising:
   a processor core;
   storage, the storage storing data comprising instructions for the processor core, wherein the data is split up into at least one block; and
   a tamper-resistant hardware security module which is coupled to the storage for reading and writing;
the method comprising:
carrying out, using the hardware security module, cryptographic error correction on the data as it is read from the storage to be passed to the processor core for execution;
storing, in the electronic control unit, at least one first cryptographic key;
signing each block with a second cryptographic key corresponding to the first cryptographic key such that the cryptographic error correction relies on the first cryptographic key in performing the cryptographic error correction to indicate whether each block of data was signed with a corresponding second cryptographic key and whether the block of data has been altered since signature; and
if the block of data has been altered then correcting any alterations in the data.

19. The method of claim 18, in which the processor core has a cache for the data, the method comprises reading the data in cachelines; each block representing one cacheline of data after cryptographic error correction.

20. The method of claim 18 wherein the processor is comprised of a single integrated circuit.

* * * * *